United States Patent [19]

Kamerbeek et al.

[11] 4,135,107
[45] Jan. 16, 1979

[54] MULTI-PHASE ALTERNATING CURRENT MACHINE WITH STEPPED STATOR

[75] Inventors: Evert M. H. Kamerbeek; Herman G. Lakerveld, both of Eindhoven, Netherlands

[73] Assignee: U.S. Philips Corporation, New York, N.Y.

[21] Appl. No.: 579,599

[22] Filed: May 21, 1975

[30] Foreign Application Priority Data

May 27, 1974 [NL] Netherlands .................. 7407056

[51] Int. Cl.² .................................. H02K 3/00
[52] U.S. Cl. .................................. 310/179
[58] Field of Search ............ 310/179, 180, 184, 198, 310/200–208, 211, 213, 266, 156

[56] References Cited

U.S. PATENT DOCUMENTS

| | | | |
|---|---|---|---|
| 2,561,352 | 7/1951 | Ferris | 310/180 |
| 2,683,231 | 7/1954 | MacFarlane | 310/184 |
| 2,708,733 | 5/1955 | MacFarlane | 310/188 |
| 3,381,154 | 4/1968 | Madsen | 310/213 |
| 3,495,114 | 2/1970 | Kazansky | 310/208 |
| 3,529,192 | 9/1970 | Davies | 310/202 |
| 3,541,361 | 11/1970 | Nola | 310/10 |
| 3,566,171 | 2/1971 | Tichy | 310/180 |
| 3,629,636 | 12/1971 | Hill | 310/200 |

Primary Examiner—R. Skudy
Attorney, Agent, or Firm—Robert S. Smith

[57] ABSTRACT

A multiphase electric machine whose stator winding is disposed in an air gap between a smooth stator wall and the rotor. The coils of the stator winding are wound stepwise in such a way that per coil the field variation in the direction of movement of the rotor is substantially sinusoidal and the winding has a constant thickness.

10 Claims, 19 Drawing Figures

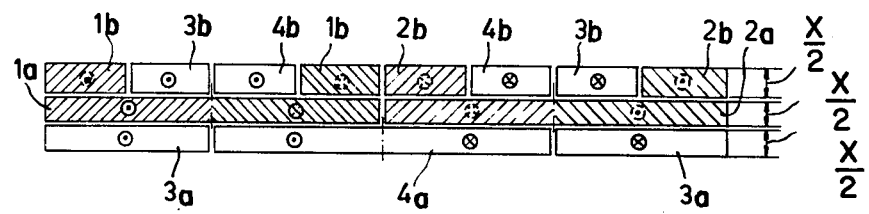
Fig.5
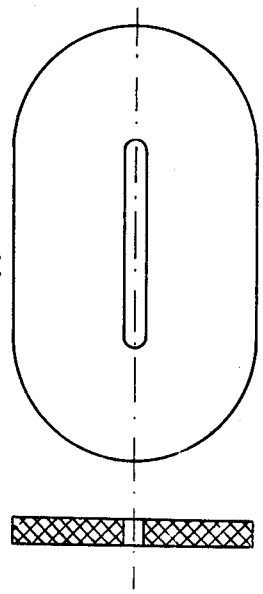
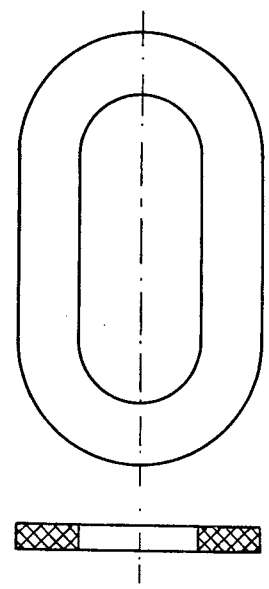
Fig6a  Fig6b

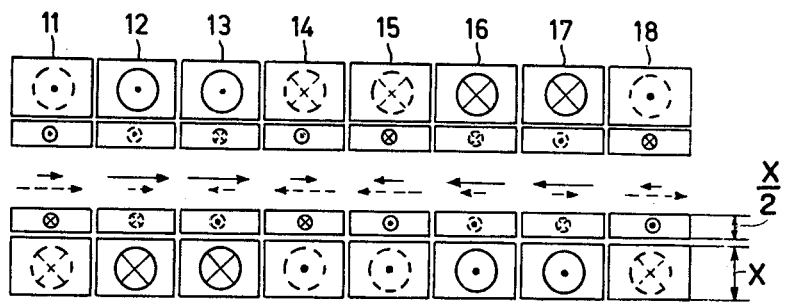
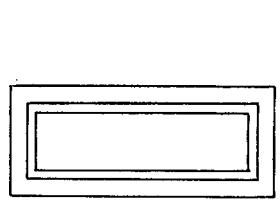 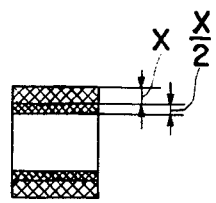
Fig. 8a    Fig. 8b
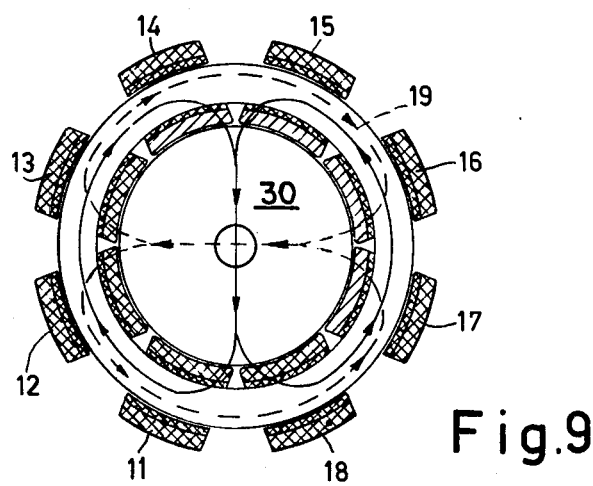
Fig. 9

MULTI-PHASE ALTERNATING CURRENT MACHINE WITH STEPPED STATOR

The invention relates to a multi-phase alternating current machine which comprises a rotor and a stator which is provided with a winding consisting of coils.

With such machines the coils are usually arranged on the stator in slots which adjoin the air gap between stator and rotor, which slots extend in a direction perpendicular to the direction of movement of the rotor. It is attempted to distribute the turns over the slots in such a way that the wire distribution is approximately sinusoidal, but this remains a rough approximation.

By the formation of the slots in the stator the air gap periodically varies in the direction of movement, so that the departure from the sinusoidal shape becomes even greater.

According to the invention said drawbacks are mitigated. The coils are provided with a number "n" of different radial coil dimensions. The active part of the coils is disposed in the air gap between the smooth stator surface and the rotor and the conductor dimension in a radial direction of the coils of each phase remains constant through successive angles of $90/n$ ° el, where n is an integer > 1, and decreases through an angle of 90° el. from a maximum value x to a minimum value $x/n$ in equal steps and subsequently increases through the next angle of 90° el. from a minimum value $x/n$ to a maximum value x in equal steps. The wire distributions of the consecutive phases along the circumference are each time offset through an angle of $2x \cdot 90/M$ °el. in the same direction where the letter "M" is equal to the number of phases in the motor. M/N is an integer for odd values of M and n being greater than 1 for even values of M.

It is true that even in the case of a flat embodiment of the coils the air gap becomes substantially greater and the magnetic induction and thus in principle the torque would decrease as a result of this, but owing to the cancellation of the stator teeth and the resultant greater inner diameter of the stator the rotor can also become larger at the same outer diameter of the stator, so that the torque increases again.

Moreover, when stator slots are provided, the effective air gap is greater than the geometric air gap, because the flux which is concentrated in the stator teeth saturates the iron locally, so that the permeability of the iron substantially decreases.

Furthermore, the iron losses in a slotless stator are smaller, because the eddy current and hysteresis losses are substantially proportional to the square of the magnetic induction, which in the teeth of a slotted stator is substantially higher than in a slotless stator.

In addition, higher current densities are permissible in coils which are disposed in the air gap, because inter alia owing to a flat shape the contact surface with the air and the stator iron is greater, so that their cooling is better.

In an embodiment of a machine according to the invention the winding is completely disposed in the plane of the air gap and the coils have a stepwise thickness variation in the direction of movement of the rotor, in such a manner that the thickness from the center of the coil at either side remains constant over substantially a $1/n$ th part, the minimum thickness $x/n$ being located in the center of the coil and increasing to the maximum thickness x towards the outside in equal steps.

As a result, it is possible to arrange the coils completely on the stator at the side of the rotor and to make the coils engage with each other at the location of the air gap so as to form a continuous flat layer, so that the space available for the turns in the air gap is utilized in an optimum manner and, moreover, the sinusoidal field distribution is approximated very closely.

When in order to a simplify winding it is undesirable to have a transition in the thickness of the coils, it is posbible in a different embodiment of a machine according to the invention, while maintaining the advantages, to divide each coil into n portions of equal thickness and to connect said portions in series.

In a further embodiment of a machine according to the invention, the coils take the form of toroidal coils on an annular stator and have a stepwise thickness variation in the direction of movement of the rotor such that the thickness increases in equal steps from the minimum thickness $x/n$ to the maximum thickness x. Thus it is possible to avoid large coil ends in which in particular with short rotors a substantial part of the energy is dissipated, which energy does not contribute to the torque, and which coil ends make the machine unnecessarily long.

In another embodiment of a machine according to the invention the toroidal coils have a width of $90°/n$ el. and the coils of all phases are wound concentrically around each other.

This has the advantage that the number of coil types can be minimized. The parts in the coils which belong to the same phase are then connected in series.

Machines according to the invention may take the form of an asynchronous machine with a squirrel cage-armature, or of an hysteresis machine, or of a synchronous machine with a permanent or energized magnet, or of an asynchronous machine with a reluctance rotor for example of massive steel. Especially in the case of these two last-mentioned types, in particular those which have been designed for very high speeds, the invention offers special advantages, because the higher harmonics of the non-sinusoidal field, which would arise in a slotted stator, do not occur. An inconvenience of the torques which are produced by said harmonics is that they nearly all counteract the torque of the fundamental wave in the operating range. In the case of a squirrel cage-armature machined the effect of the most important of said torques may be substantially reduced by a suitable choice of the number of rotor bars and the inclination thereof, but especially in the case of hysteresis machines and machines with massive steel rotors this is not possible. For example, in the case of such a machine with a stator which is provided with 12 slots, which is energized with 600 Hz at a slip of 10%, the torque decreases by 20% as a result of the 11th, 13th, 23rd and 25th harmonics of the field. The additional thermal losses in the rotor owing to the 11th harmonic alone amount to approximately 85% of those as a result of the fundamental wave.

In a machine according to the invention with a massive steel rotor for high speeds the stator volume can be reduced to half that of a conventional machine with the same rotor diameter, while maintaining the output power.

In the above the term rotor is to be understood to mean also the moving part of a linear motor, as said part may be considered as a part of a rotor of infinitely large diameter.

In the present specification the term alternating current machine is to be understood to include both motors and generators.

The invention will now be described in more detail with reference to the following Figures, in which FIG. 1 shows the field distribution measured in a conventional stator of a two-phase machine with 12 slots, FIG. 2 shows the same in a stator of a machine according to the invention, FIG. 3a shows a flat winding for a two-phase machine for which n = 2, developed along a straight line, FIG. 3b shows the variation of the field thereof in the direction of movement of the rotor relative to the ideal sinusoidal variation, FIGS. 3e and 3c are views similar to FIG. 3a for n = 3 and n = 4 respectively, FIGS. 3f and 3d are views similar to FIG. 3b for n = 3 and n = 4 respectively, FIGS. 4a and 4b are views of the coil of FIG. 3a showing the two cross-sections thereof, FIG. 5 is a cross-sectional view of another winding which accomplishes the same purpose as the winding of FIG. 3a with individual discrete coils of which each have uniform thickness FIGS. 6a and 6c show one coil and 6b and 6d the other coil for the winding of FIG. 5, the views being respectively cross-sectional and plan views in each case, FIG. 7 shows in a cross-section taken through a plane parallel to the axis of the stator a toroidal winding for a stator in accordance with another form of the invention, FIGS. 8a and 8b show the coils for the winding of FIG. 7, FIG. 9 shows how such coils are arranged on the stator in a cross-sectional view taken through a plane extending at right angles to the axis, FIG. 10a shows in a cross-section taken through a plane parallel to the axis of the stator another winding for a three-phase machine with n = 3, FIGS. 10b, c and d show the shapes of the coils required for this, FIG. 11 shows a toroidal winding for a three-phase machine, FIG. 12 represent the torque and efficiency for a conventional two-phase machine operating as a motor and a machine according to the invention with the same rotor.

Figure 1:
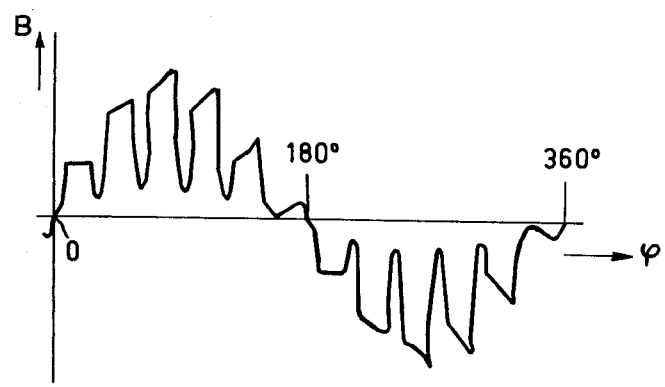

FIG. 1 shows how the field of a conventional stator for a two-pole two-phase machine with 12 slots along the circumference varies at a specific instant. It is apparent that at the location of the slots the field substantially decreases so that of course the magnitude of the generated torque is adversely affected. The higher harmonics associated with said field distribution cause a substantial increase of the eddy-current and the hysteresis losses and give rise to torques associated with said harmonics. As the machine at its desired speed always rotates more rapidly than the synchronous speed which corresponds to said harmonics, the machine will always operate with a braking action for said harmonics.

Figure 2:
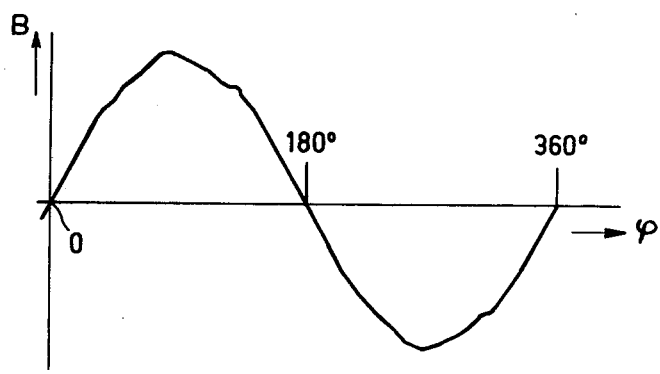

FIG. 2 shows the field distribution measured for a stator of such a machine according to the invention. This reveals the substantial progress relative to the field distribution of FIG. 1 and the close approximation of the sinusoidal shape.

Figure 3A:
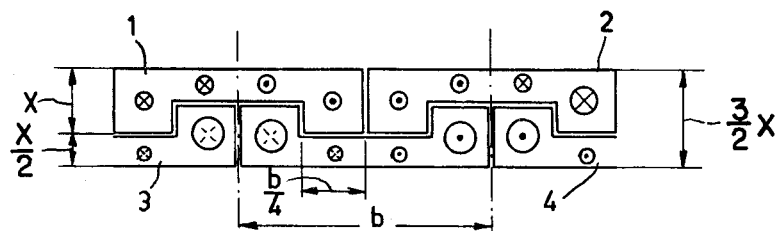
Figure 4B:
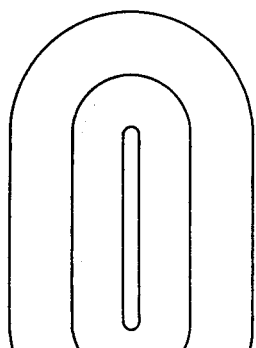
Figure 4A:
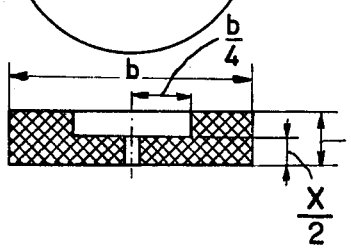

FIGS. 3a, 4a and 4b show how a flat winding of a two-phase machine according to the invention may be constructed. The coils 1 and 2 both belonging to the same phase and the coils 3 and 4 both to the other phase. As used herein the letter M represents the number of motor phases for this embodiment M accordingly equals two. The coils are wound as flat coils with a step-wise variation in their lateral direction. Starting from the center of the coils they have a thickness of x/2 to either side over a quarter of the width b, after which their thickness increases to an amount x. The coils can be hooked into each other and then constitute a flat layer having a thickness of approximately 3/2x. It is obvious that this is only so that at the location of the air gap, because outside the air gap the ends of said coils must be slightly bent away.

Figure 3B:
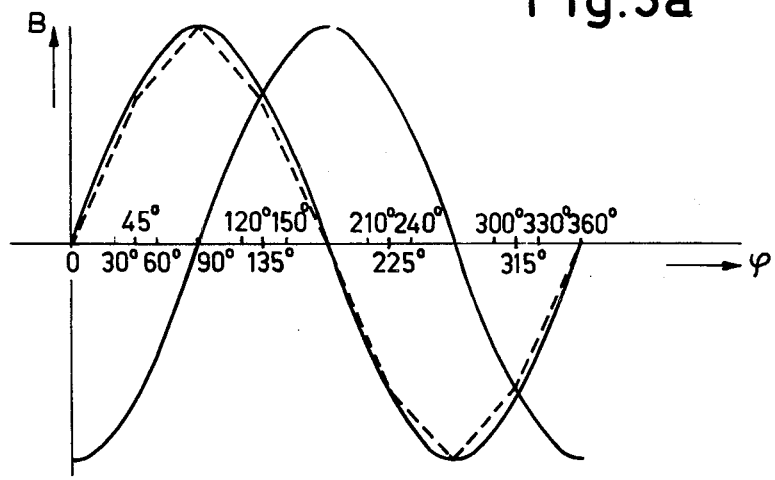
Figure 3E:
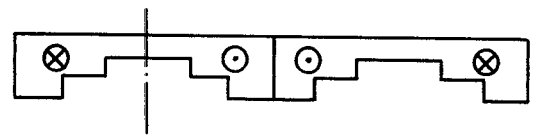
Figure 3C:
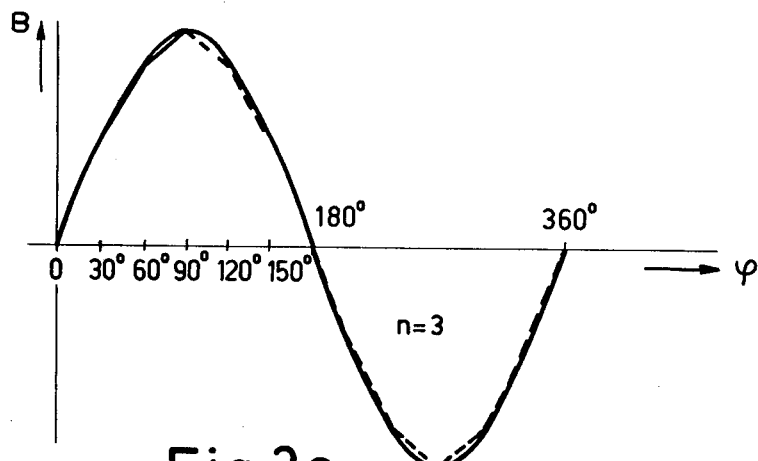
Figure 3F:
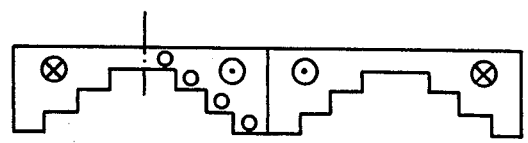
Figure 3D:
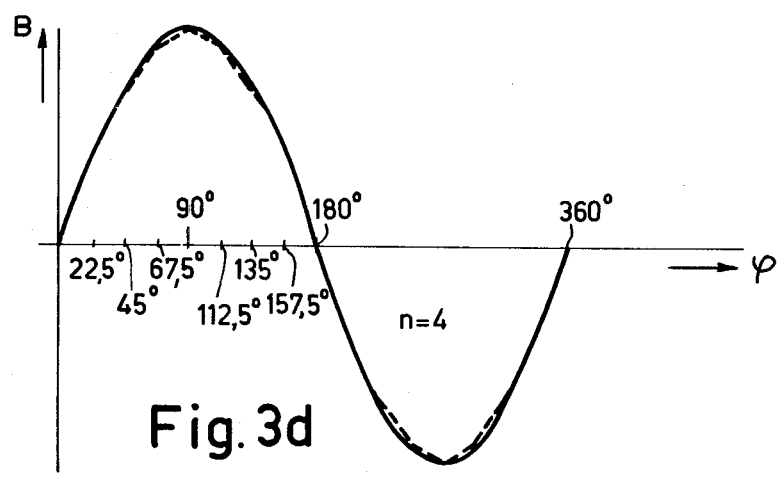

In FIG. 3b the continuous line indicates how the field variation would be at the indicated instant of FIG. 3a when the turns of the coil would be distributed purely sinusoidally, and the dashed line represents the actual variation for the current direction indicated in FIG. 3a. Again it is found that the sinusoidal variation is very closely approximated. When an even better approximation of the sinusoidal shape is desired, the number of steps i.e. n, over which the conductor dimension in the radial direction may be increased. This dimension changes from the minimum value x/n to the maximum value x. FIGS. 3c and 3d, (which correspond to FIG. 3a and n = 2) show progressively better approximation of a sinusoidal distribution with an increase in n.

Figure 14:
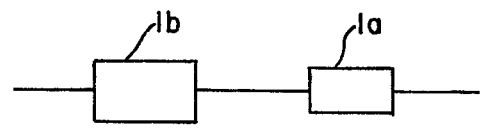
FIG. 14 is a diagrammatic representation showing the electrical connection between a plurality of portions of a coil.

When it is preferred to make coils of a constant thickness, the solution of FIG. 5 may be chosen, for which the corresponding coils are shown in FIGS. 6a, 6b, 6c, and 6d. The constant thickness coils corresponding to the construction of FIG. 4 are no longer stepped, so that it is possible to provide a winding of three layers each having a thickness of x/n, so that three superposed smooth layers are obtained. For the coils of FIG. 4, only one coil type was required. In the constant thickness embodiment of FIG. 5 two coil types are required as is evident from FIGS. 6a and 6b. The associated windings of FIGS. 6a and 6b are connected in series, so that the operation of these two coils together is the same as that of one coil of FIG. 4. In FIG. 5 the interconnection of coils produces the equivalent of one coil of the type shown in FIG. 4. The interconnection between the portions of one coil are shown schematically in FIG. 14.

FIG. 7 shows how said winding can take the form of a toroidal winding. The coils 11 through 18, as is shown in FIGS. 8 and 9 are wound as rectangular coils. They are arranged around an annular stator 19, as is shown in FIG. 9 for a two-pole two-phase machine which includes a rotor 30. In this case the coils are wound in two concentric layers having a thickness of x/2 and x respectively. From the shape of the coils it is evident that the length of the machine does not substantially increase owing to the coil ends.

Figure 10A:
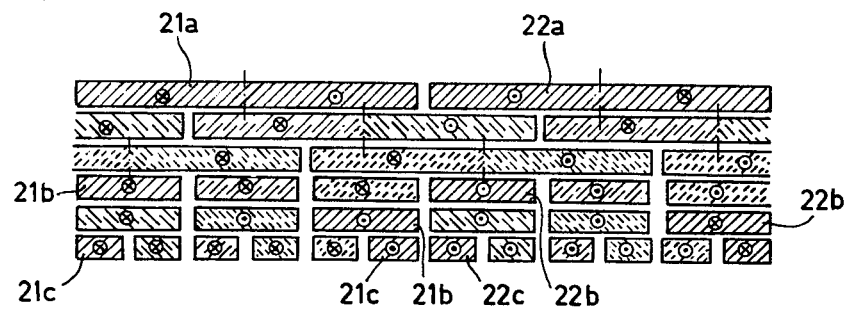

FIG. 10a shows a winding similar to that of FIG. 5, i.e. consisting of coils of a non-stepped shape for a machine for which M = 3, i.e. a three-phase machine with n = 3, is composed of six layers. The variation of the field in the direction of movement of the rotor is the same as in FIG. 3c. The coil portions which are disposed above each other in a vertical direction are again connected in series, i.e. as is indicated for one phase the coil portions 21a, b and c to each other as well as the coils portions 22a, b and c.

Figure 10B:
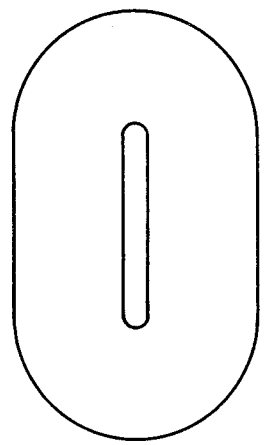
Figure 10C:
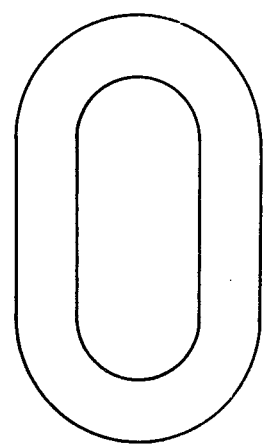
Figure 10D:
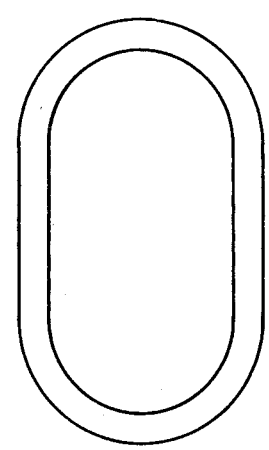

FIGS. 10b, 10c and 10d show the coil portions required for the structure shown in FIG. 10a. For a three-phase machine three types of flat coils are then required.

Figure 11:
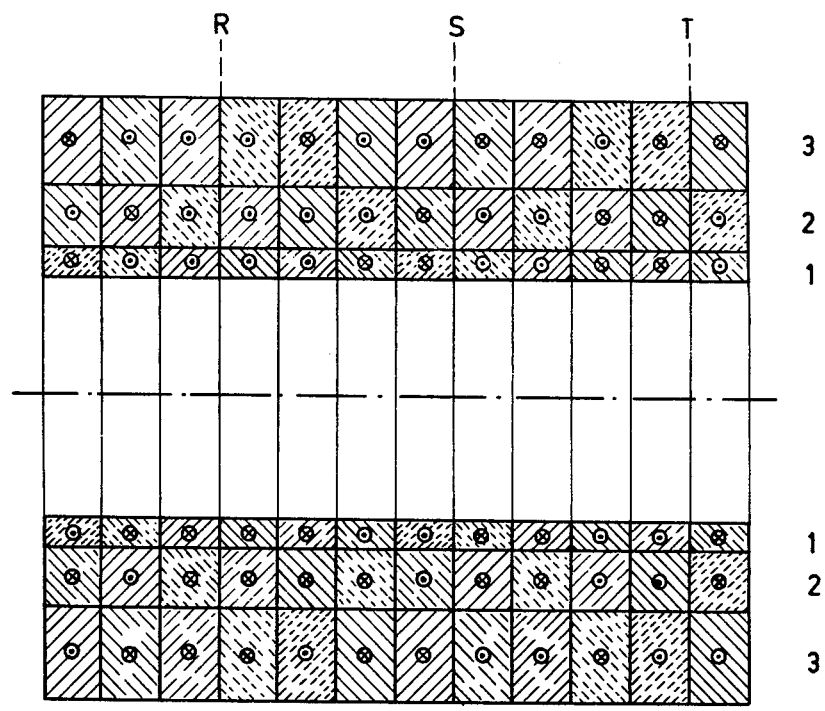

FIG. 11 shows for a two-pole three-phase machine how the winding may be composed of toroidally wound coils. The number of steps n for machines for which M is even may be selected arbitrarily with a minimum of 2, because then always a winding of constant thickness can be obtained since the windings, which correspond to two phases which are 180°el. phase-shifted, exactly engage each other.

For example, a six-phase winding may be composed of three two-phase windings with coils for which n is an arbitrary number > 1, which number is only limited by the number of wires per layer, which three two-phase windings are shifted 120°el. relative to each other in the direction of movement of the rotor. Another possibility is to use two three-phase windings for each of which M/n should be integral number, for which the only solution is n = 3, i.e. coils with three steps. Finally, it is possible to obtain one six-phase winding with n = 6.

In the case of a winding of a machine with an odd number of phases it is not possible to select the number of steps n arbitrarily, because in that case the thickness of the winding would not be constant. In such cases M and n should be selected so that M/n is an integral number, i.e. for a three-phase winding n becomes 3, for a five-phase winding n becomes 5. For a nine-phase winding there are two possibilities, viz. n = 3 and n = 9. In the first case three three-phase windings are obtained which are mutually 40°el. shifted, and in the second case a single nine-phase winding is obtained.

Figure 12:
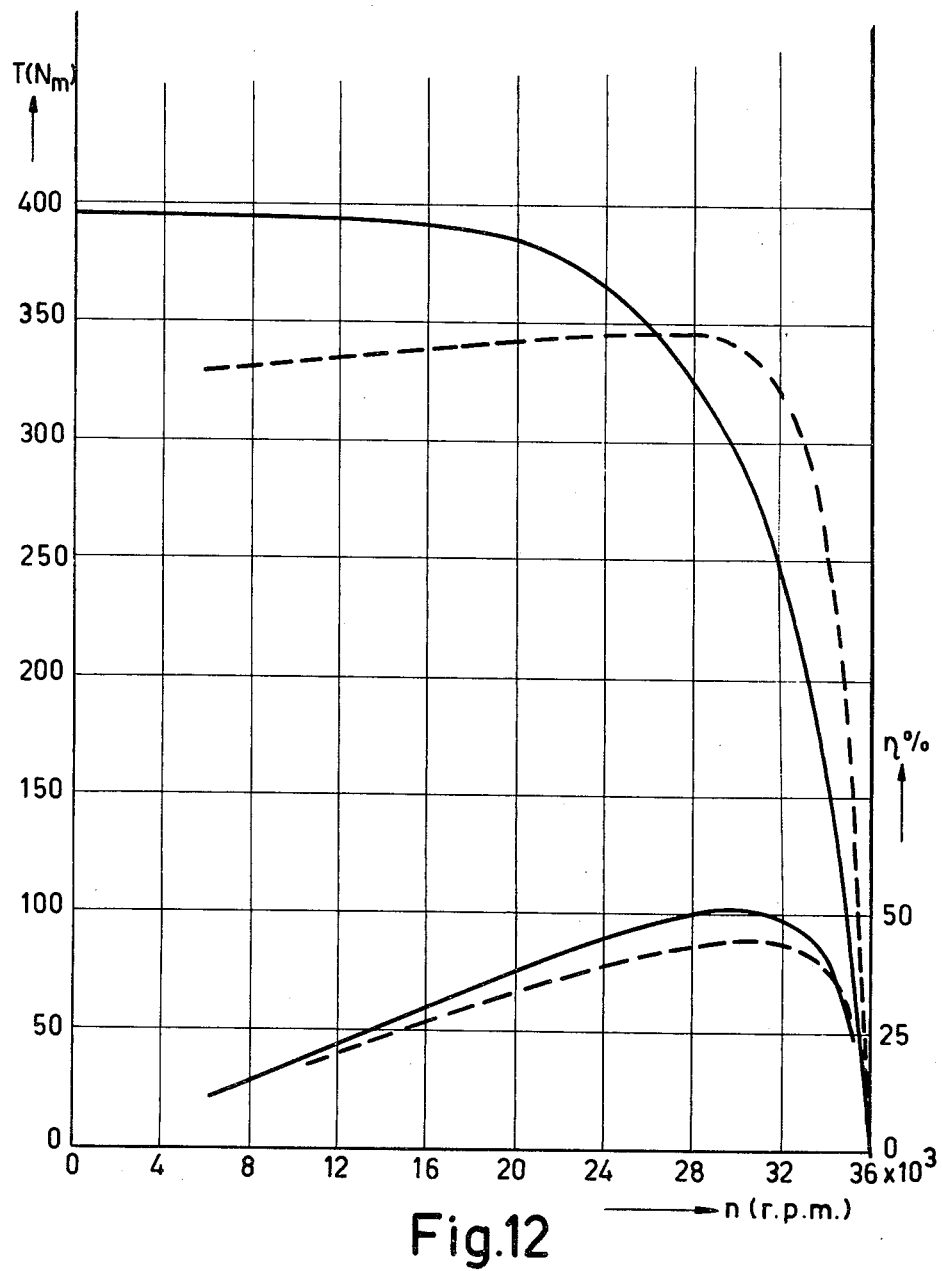

FIG. 12 shows the variation of the torque and the efficiency as a function of the speed for two motors having the same rotor diameter, which are energized with a 600 Hz alternating voltage. The solid line represents a massive rotor with an air gap winding. The dashed line represents a conventional motor with 12 slots in the stator. It is obvious that at a slightly greater slip the torque of the motor with massive rotor and having an air gap winding, is even greater than that of a conventional squirrel cage motor with 12 slots in the stator. The efficiency of the former is greater than that of the conventional motor over substantially the entire range.

Figure 13:
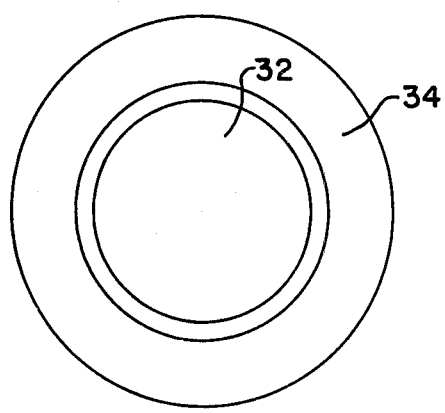
FIG. 13 is a diagrammatic representation of a rotor and a stator.

FIG. 13 is a diagrammatic representation of a rotor 32 and stator 34 in accordance with the invention. It will be understood that the specific stator construction may vary in accordance with the constructions described above. The rotor or stator 34 may be of various constructions including a squirrel cage rotor, a reluctance rotor, hysteresis rotor, and a rotor with permanent or energized magnet.

What is claimed is:

1. An multi-phase alternating current machine which comprises: a rotor, a stator having a smooth internal surface, and a winding having the coils thereof distributed in a substantially sinusoidal array, said winding consisting of a plurality of coils of conductors, the active part of all said coils being disposed in the air gap between the smooth stator surface and the rotor, the radial dimension of all of said conductors in each coil in each phase in the radial direction being constant through successive angles of 90/n °el., where n is an integer > 1, said radial dimension changing from a maximum value x to a minimum value x/n in progressive equal steps and subsequently increasing from a minimum value x/n to a maximum value x in equal progressive steps, the wire distributions of the consecutive phases along the circumference are each time shifted through an angle of 2 x 90/M °el. in the same direction, M/n being an integer for odd values of M.

2. A machine as claimed in claim 1, wherein the winding is completely disposed in the plane of the air gap and the conductors of each coil have a step-wise thickness variation in the direction of movement of the rotor, such that the thickness from the center of the coil remains constant at either side over substantially a 1/n th part, the minimum thickness x/n being located in the center and the thickness increasing to the maximum thickness x towards the outside of the coil in equal steps.

3. A machine as claimed in claim 2, wherein each coil consists of n portions of uniform radial thickness, each of said portions being connected in series.

4. A machine as claimed in claim 1, wherein each of said coils take the form of toroidal coils on an annular stator and the conductors thereof have a stepwise thickness variation in the direction of movement of the rotor such that said thickness increases in equal steps from the minimum thickness x/n to the maximum thickness x.

5. A machine as claimed in claim 4, wherein the toroidal coils have a width of 90/n °el. and the coils are wound concentrically around each other.

6. A machine as claimed in claim 1 wherein the rotor is a squirrel-cage rotor.

7. A machine as claimed in claim 1 wherein the rotor is a hysteresis rotor.

8. A machine as claimed in claim 1 wherein the rotor is a massive steel rotor.

9. A machine as claimed in claim 1 wherein the rotor consists of a magnet.

10. A machine as claimed in claim 1 wherein the rotor is a laminated rotor.

* * * * *